US006673145B2

United States Patent
Bompay et al.

(10) Patent No.: US 6,673,145 B2
(45) Date of Patent: Jan. 6, 2004

(54) PROCESS FOR MANUFACTURING A SOIL TREATMENT COMPOSITION, SOIL TREATMENT COMPOSITIONS AND USE OF SUCH COMPOSITIONS

(75) Inventors: Jean-Yves Bompay, Fresnoy le Luat (FR); Jean-Michel Prunevieille, Vaucresson (FR); Kenneth Wright, Lane Milford, MI (US)

(73) Assignees: Mecaroute, Nanterre (FR); European Steel Mill Services, Paris (FR)

( * ) Notice: Subject to any disclaimer, the term of this patent is extended or adjusted under 35 U.S.C. 154(b) by 0 days.

(21) Appl. No.: 10/151,956

(22) Filed: May 22, 2002

(65) Prior Publication Data

US 2003/0004062 A1 Jan. 2, 2003

(30) Foreign Application Priority Data

May 23, 2001 (FR) .............................. 01 06782

(51) Int. Cl.[7] .............................. C04B 2/00; C04B 5/00
(52) U.S. Cl. ...................................... 106/791; 106/900
(58) Field of Search .................................. 106/791, 900

(56) References Cited

U.S. PATENT DOCUMENTS 1,731,189 A    10/1929    Bergquist

FOREIGN PATENT DOCUMENTS

| CZ | 282855 | * 11/1997 |
| FR | 2 453 837 | 11/1980 |
| FR | 2463755 | * 2/1981 |
| FR | 2 733 774 | 11/1996 |
| GB | 2 025 390 | 1/1980 |
| JP | 55125186 | * 9/1980 |
| JP | 01081885 | * 3/1989 |
| JP | 10204432 | * 8/1998 |
| JP | 10219246 | * 8/1998 |
| JP | 11293244 | * 10/1999 |
| LU | 76 984 | 7/1977 |
| WO | WO 89/04815 | 6/1989 |

* cited by examiner

Primary Examiner—Paul Marcantoni
(74) Attorney, Agent, or Firm—Young & Thompson

(57) ABSTRACT

The present invention relates to a process for manufacturing a soil treatment composition, to soil treatment compositions and to the use of such compositions. The process according to the invention comprises a step of selecting one or more slags having a predetermined free lime content of greater than or equal to a first threshold value, a step (B1) of adding free lime to the slag or slags and a step of grinding the slag or slags in order to obtain a soil treatment composition having a predetermined free lime content of greater than or equal to a second value.

12 Claims, 2 Drawing Sheets

PROCESS FOR MANUFACTURING A SOIL TREATMENT COMPOSITION, SOIL TREATMENT COMPOSITIONS AND USE OF SUCH COMPOSITIONS

FIELD OF THE INVENTION

The present invention relates to a process for manufacturing a soil treatment composition, to soil treatment compositions and to the use of such compositions.

The invention relates in particular to a process for manufacturing a soil treatment composition using slag from oxygen-conversion steelworks and to soil treatment compositions based on such slag.

BACKGROUND OF THE INVENTION

Oxygen-conversion steel making slag is a by-product resulting from the oxygen-refining of pig iron, for example using the Linz-Donawitz (LD) process, in order to obtain a steel resulting from the decarbonization of pig iron. This refining is carried out by the addition of lime to the molten pig iron placed in a converter. The lime allows the impurities to be extracted, by reacting on the latter in order to form the slag. In the present case, a slag refers to an oxygen-conversion steel making slag obtained from a single heat of a converter. The amount of lime added to the converter depends on the desired level of refining, that is to say on the quality of steel desired. The free lime or quicklime that has not reacted appears in the resulting slag. Depending on the amount of lime added, the free lime content in the resulting slag may vary significantly, generally between 1 and 15% by weight, and may exceptionally reach values of 17–18% by weight. After cooling, the slag is crushed into the form of granules or aggregates and is treated during a deironing step so as to recover some of the iron that it contains. This deironing step is carried out before and during the crushing, mainly only little afterwards.

For use in the production of roadways in the form of aggregates, the free lime content of this steel making slag has huge problems, because of the very substantial risk of the nodules of free lime trapped in the slag swelling, resulting in the granules bursting. Generally speaking, the various types of slag, in granule form, coming from different heats are stored together. In this case, the coarse granules, with a size greater than 8 mm, are collected by screening to be used, for example, for the production of forest tracks or in the agricultural fertilization field. This is because the higher the free lime content the more friable the slag. Thus, the coarser granules have the lowest free lime content. The other granules, of less than 8 mm in size, have a free lime content varying from 1 to 15% by weight and are generally rejected without being used.

However, it is possible to predict the free lime content for a given slag, according to the lime added to the converter. Thus, when the slag has less than 5% of free lime, it can be used in aggregate form to produce roadways. From 1 to 2% by weight, the aggregates constitute what are called high-quality aggregates which can be used to produce the surface layer or bituminous mix, on the surface of a roadway. From 2 to 4.5–5% by weight, the slag may be used to produce the intermediate course and the base course of a roadway. Above a free lime content of 5%, it is considered that the slag cannot be used in granule form because of the abovementioned risk of the granules bursting. In order for this slag to be economically utilized, it has therefore been envisioned to limit its free lime content. A first solution consists in injecting silica and oxygen into the converter, after the steel has been discharged, in order to make the free lime react. This solution allows the free lime content to be reduced down to 1 to 2% by weight, but proves to be very expensive. A second solution consists in subjecting the granules to prolonged storage in the open air, for several months. This storage makes it possible to hydrate the granules and thus lower the free lime content down to a threshold of 4.5 to 5% by weight. However, this solution does not allow hydration of the free lime nodules in the core of the granules in order to make them burst.

Moreover, to stabilize and reinforce a soil, especially for the preparation of roadways, it is known to spread lime over the soil in a first step and then treat the soil with cement in a second step. The lime treatment is intended especially to break up the clumps of soil by flocculating the clayey particles. To replace this lime-then-cement treatment, patent application FR 2 733 774 provides treatment products comprising an ungraded oxygen-conversion steel making slag or one with an unselected initial free lime content and blast-furnace slag, which products are preferably ground. In a first step, the soil is mixed with an oxygen-conversion steel making slag. In a second step, the soil is mixed with the blast-furnace slag which acts as hydraulic binder. The steel making slag is used to flocculate the clay particles of the soil to be treated and to activate the blast-furnace slag. However, that document, which does not specify the precise nature of the steel making slag used, requires large amounts of such steel making slag having an unselected free lime content, which are not easily transportable because of their high density, in order to obtain the desired effect.

Thus, the steel making slag having a free lime content of greater than 5% is currently very little used for the aforementioned reasons, such slag representing more than 55% of the total tonnage of steel making slag produced in France. The object of the invention is to provide a solution allowing this oxygen-conversion steel making slag to be used.

SUMMARY OF THE INVENTION

For this purpose, the invention provides a process for manufacturing a soil treatment composition, which comprises a step of selecting one or more slags having a predetermined free lime content of greater than or equal to a first threshold value, a step of adding free lime to the slag or slags and a step of grinding the slag or slags, in order to obtain a soil treatment composition having a predetermined free lime content of greater than or equal to a second value.

Advantageously, the selection step consists in selecting one or more oxygen-conversion steel making slags.

According to a first method of implementation, said step of adding free lime consists in adding free lime to an oxygen-conversion steel making slag heat, in the molten state, coming from a converter for smelting the pig iron into steel using a charge of lime and then in cooling said heat in order to obtain a solid overlimed slag having a free lime content of greater than or equal to the second aforementioned value, said grinding step consisting in grinding one or more overlimed slags obtained in the preceding step.

According to a second method of implementation, said step of adding free lime consists in adding free lime to one or more oxygen-conversion steel making slags in the solid state, obtained after cooling one or more slag heats coming from a pig iron-to-steel converter using a charge of lime, said addition step being carried out before or during said grinding step, so as to obtain an intimate mixture of slag(s) and free lime, said intimate mixture forming the treatment composition.

According to one feature, the step of adding free lime is preceded by a step of chemically analyzing the slag or slags in order to determine the necessary amount of free lime to be added in order to attain or exceed the second aforementioned value.

According to another feature, said selection step consists in selecting slag heats in the molten state coming from a pig iron-to-steel converter, according to the charge of lime added to said converter in order to prepare the desired steel.

Advantageously, the process comprises a step of deironing the oxygen-conversion steel making slag(s) in the solid state.

Moreover, the invention provides a first type of soil treatment composition, characterized in that it comprises one or more ground slags having a free lime content of greater than 18% by weight.

The invention provides a second type of soil treatment composition, characterized in that it consists of an intimate mixture of one or more ground slags having a free lime content of greater than or equal to 5% by weight and of free lime, said mixture having a free lime content of greater than 15% by weight.

The invention furthermore provides the use of the aforementioned soil treatment compositions to dry and flocculate a soil.

BRIEF DESCRIPTION OF THE DRAWINGS

The invention will be more clearly understood, and further aims, details, features and advantages will become more clearly apparent in the course of the detailed explanatory description which follows of two currently preferred particular methods of implementing the process according to the invention, with reference to the appended schematic drawing.

In this drawing.

DETAILED DESCRIPTION OF THE INVENTION

Figure 1:
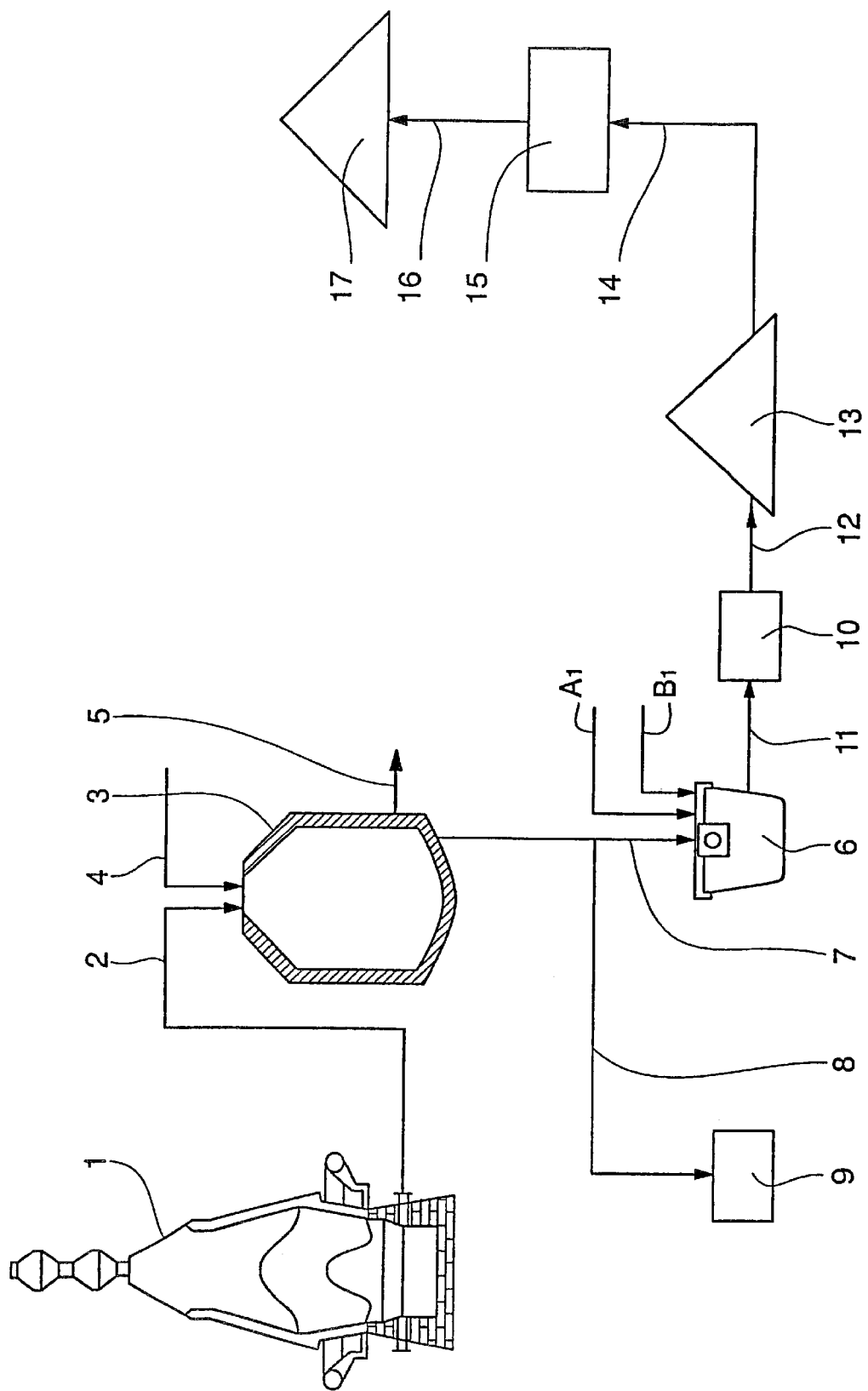
FIG. 1 shows schematically the process for manufacturing a soil treatment composition according to a first method of implementation.
Figure 2:
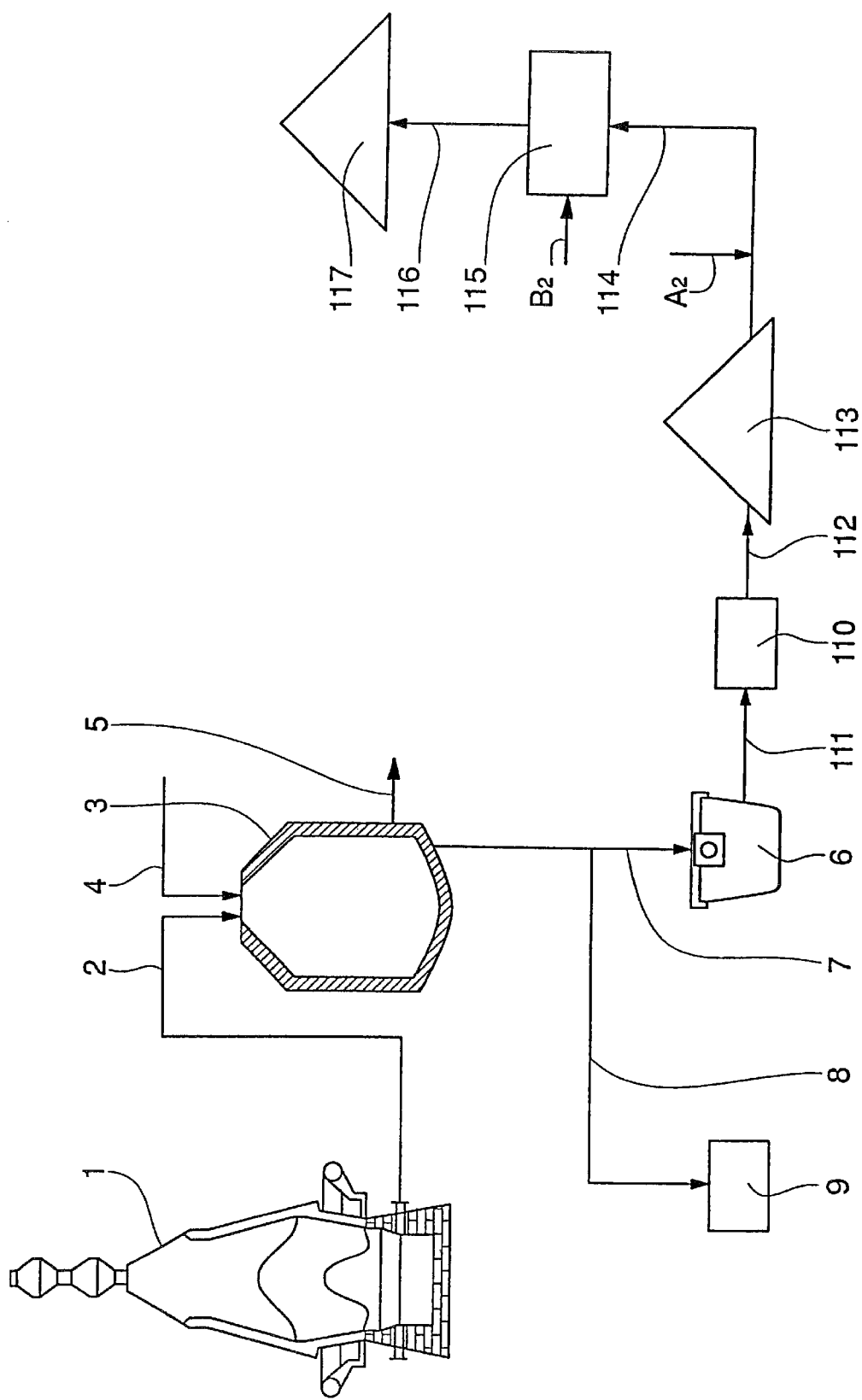
FIG. 2 shows schematically the process for manufacturing a soil treatment composition according to a second method of implementation.

The process for manufacturing a treatment composition according to the invention preferably uses oxygen-conversion steel making slags resulting from the manufacture of steel from pig iron, for example using the LD process. According to FIG. 1, the molten pig iron from a blast furnace 1 is introduced, as indicated by the arrow labeled 2, in a known manner into a steel conversion furnace, usually called a converter 3. Lime is then introduced into the converter, as indicated by the arrow labeled 4. The amount of lime added is predetermined according to the desired steel quality. After extraction 5 of the molten steel from the converter, the resulting slag heat, for example around 20 tons, is poured into a slag pot.

The average chemical composition of a slag obtained by an LD process, called LD slag, is, after deironing, as follows:

| Compound | % by weight in the slag |
|---|---|
| CaO | 40–55 |
| $SiO_2$ | 10–15 |
| $Al_2O_3$ | 1–3 |
| MgO | 2–8 |
| metallic Fe | 10–20 |
| MnO | 2–7 |
| $P_2O_5$ | 1–2 |
| S | <0.05 |

The slag comprises from 45 to 55% by weight of free lime (CaO) which is reactive or has reacted, and from 0 to 15% by weight of reactive free lime.

Depending on the amount of lime added to the converter, it is possible to predict the amount of lime that has not reacted, namely the free lime, in the heat. A preselection of the heats is thus made in order to treat by the process according to the invention only heats having a free lime content of greater than a first threshold value of at least 5% by weight. If the heat is liable to contain more than 5% by weight of free lime, it is transferred from the converter 3 to a slag pot 6, as indicated by the arrow 7. Otherwise, the heat is discarded, pouring it into a recovery basin 9, as indicated by the arrow 8. Depending on its free lime content, the slag resulting from the latter heats may be used to produce a surface course, an intermediate course or a base course of a roadway, as described above.

According to a first method of implementation illustrated in FIG. 1, in a first step A1 a chemical analysis of the heat that has just been collected in the pot 6 is carried out so as to determine its precise free lime content. Depending on the measured content, lime is added, in a second step B1, to the molten slag in order to obtain what is called an overlimed slag having a predetermined free lime content of greater than or equal to a second value of at least 15% by weight. The free lime content of the overlimed slag is, for example, between 15 and 50% by weight. The added lime consists predominantly of free lime; preferably at least 80% is free lime. Next, the molten slag is transferred to a recovery basin 10 in order to cool. The solidified slag is then stored in heaps 13. These transfer and storage steps are represented by the arrows labeled 11 and 12 respectively. The slag is then taken, as indicated by the arrow 14, to a grinding unit 15 in which the slag is ground so as to obtain a slag in the form of powder, called ground slag. The slag is ground to a particle size of less than 100 $\mu$m, preferably less than 50 $\mu$m, for example about 20 $\mu$m. The ground slag has a Blaine specific surface area (NF EN 196-6 standard) of less than 5 000 $cm^2/g$, for example around 3 500 $cm^2/g$. The slag is deironed by a magnetizing process known per se. This deironing step is carried out after the step of cooling the solidified slag, before, during and/or after the grinding operation. The ground and deironed slag is then stored in silos 17 to prevent degradation of the ground slag by the action of water, this step being labeled by the arrow 16. This ground slag, having a defined free lime content, constitutes a soil treatment composition according to the invention, one use of which is described below. Depending on the application of the composition, compositions of various free lime contents may be produced. Various overlimed slags coming from various heats and having been adjusted to an identical or substantially identical free lime content may be stored in the same heap 13 after cooling. The slag coming from various heats may be distributed throughout various heaps after cooling, depending on their free lime contents, the slag from different heaps being consequently ground and stored in different silos. This distributing of the slags according to their free lime content may also be carried out only after the grinding step in various silos.

According to a second method of implementation, the lime is added not to the slag in the molten state but to the slag in the solid state. The heap 7 having a free lime content of greater than or equal to a first predetermined threshold value is poured into a slag pot 6, transferred to a basin 110, in order to be cooled, and then stored in a heap 113, these various steps being indicated by the arrows 111 and 112. A chemical analysis of the slag is then carried out, as indicated by the arrow A2, in order to determine the free lime content of the slag. The slag is then taken to a grinding unit 115, as indicated by the arrow 114. In a step B2, lime is added to the slag placed in the grinding unit and the combination is ground, in order to obtain an intimate overlimed mixture of ground slag and lime, having a defined free lime content of greater than or equal to the second aforementioned value, the amount of lime added being adjusted to the free lime content of the slag measured beforehand. The deironing step may be carried out before, during and/or after the slag has been ground and before, during and/or after the free lime has been added. The significant amount of lime present in the slag, which makes it more friable, and the grinding operation make it possible to recover smaller iron particles and thus improve the effectiveness of the deironing step. The deironed mixture is then stored in silos 117, the latter step being indicated by the arrow 115. The intimate mixture thus obtained constitutes a soil treatment composition according to the invention. The lime may also be added during or after the grinding of the slag. In the latter case, grinding is continued after the addition of the lime in order to ensure an intimate mixture. In addition, the chemical analysis may be carried out on the ground slag before the addition of lime. Mixtures may be distributed in various silos 117 after the grinding step, according to their free lime contents. Optionally, the slags coming from various heats may be distributed in various heaps 113 after cooling, according to their predictable free lime contents, these being deduced from the amount of lime added to the converter in order to refine the pig iron.

In a variant of the first method of implementation, which consists in adding free lime to a molten slag, the lime is added to the molten slag in the converter after the steel has been extracted and a prior chemical analysis carried out.

The soil treatment compositions according to the invention can be used to treat a soil, for example an alluvial or clayey soil, so as to make it capable of supporting traffic, especially for site machines for producing highway and freeway platforms, or to give it a certain stability in order to produce embankments.

The soil may be treated on site or in a mixing unit. In the case of soil treatment on site, the treatment composition, comprising an overlimed slag or an intimate overlimed mixture of slag and lime, is spread over the soil to be treated with a dose calculated on a case-to-case basis, which depends on the nature of the soil to be treated and on the desired result. The composition is spread over the soil and then the soil and the composition are then mixed by means of a machine, usually called a "pulvimixer", which allows the thickness of the treated course to be adjusted. The composition may be spread over the soil either directly or with the aid of the aforementioned "pulvimixer". The soil is then compacted so as to obtain a flat surface.

The treatment of the soil with the composition has the purpose of modifying the hydric state and of neutralizing the clays. The action of the composition is manifested by a reduction in the water content and by a flocculation of the clays. This reduction in the water content results especially from an increase in the temperature due to the slaking of the free lime by water, this increase in the temperature resulting in evaporation of the water. Moreover, the treatment results in dry matter being added to the soil, the dry matter consisting of any materials in the treatment composition other than the free lime, and in aeration of the soil during mixing.

The amount of composition added to the soil to be treated will depend on its free lime content, to be compared with that of road lime conventionally used for this application, which contains about 80% by weight of free lime, and on the amount of dry matter added, which will be greater than in the case of the lime treatment. As an example, for treating a soil requiring a dosage of 1% by weight of road lime, i.e. 0.8% by weight of free lime, the theoretical dosage of a composition according to the invention comprising 30% by weight of free lime, in order to obtain the same free lime content of 0.8%, is 2.67% by weight. However, in the case of the composition according to the invention the amount of dry matter added to the soil is 1.87% by weight (2.67% of 70%), whereas in the case of the use of road lime this amount is 0.2% by weight. The impact in a wet soil of this greater addition of dry matter makes it possible to reduce the theoretical dosage of the composition based only on the free lime content. Thus, in the aforementioned example, a dosage of the composition of around 2% by weight makes it possible to obtain the same result as with a treatment with road lime.

Treatment of a soil in a mixing unit is carried out under the same conditions as those described above, only the mixing means differing. Treatment in a mixing unit makes it possible to obtain more intimate and more precise mixing of the soil with the treatment composition.

Although the invention has been described in connection with two particular methods of implementing the process according to the invention, it is obvious that it is in no way limited thereto and that it comprises all technical equivalents of the means described together with their combinations, if these fall within the scope of the invention. The process according to the invention may be applied to oxygen-conversion steel making slag, such as LD slag, and to any type of slag containing free lime, including that called arc-furnace slag or EAF (Electric Arc Furnace) slag coming from an EAF steel treatment process.

What is claimed is:

1. A process for manufacturing a soil treatment composition, which comprises:
    a step of selecting one or more slags having a free lime content of greater than or equal to a first threshold value of 5% by weight,
    a step of adding free lime to the slag or slags according to the free lime content of the slag or slags, and
    a step of grinding the slag or slags in order to obtain a soil treatment composition having a free lime content of greater than or equal to a second value of 15% by weight.

2. The process according to claim 1, where in the selection step comprises selecting one or more oxygen-conversion steel making slags.

3. The process according to claim 2, wherein
    the step of adding free lime comprises adding free lime to an oxygen-conversion steel making slag heat, in a molten state, coming from a converter for smelting pig iron into steel using a charge of lime, and then cooling said heat in order to obtain a solid overlimed slag having a free lime content of greater than or equal to the second value, said grinding step comprising grinding one or more overlimed slags obtained in the preceding step.

4. The process according to claim 2, wherein said step of adding free lime comprises adding free lime to one or more oxygen-conversion steel making slags in the solid state, obtained after cooling one or more slag heats coming from a pig iron-to-steel converter using a charge of lime, said addition step being carried out before or during said grinding step, so as to obtain an intimate mixture of slag(s) and free lime, said intimate mixture forming the treatment composition.

5. The process according to claim 1, wherein the step of adding free lime is preceded by a step of chemically analyzing the slag or slags in order to determine the necessary amount of free lime to be added in order to attain or exceed the second value.

6. The process according to claim 2, wherein said selection step comprises selecting slag heats in a molten state coming from a pig iron-to-steel converter, according to a charge of lime added to said converter in order to prepare the steel.

7. The process according to claim 2, further comprising a step of deironing the oxygen-conversion steel making slag (s) in the solid state.

8. A soil treatment composition comprising an intimate mixture of one or more ground slags having a free lime content of greater than or equal to 5% by weight and free lime; said mixture having a free lime content of greater than 15% by weight.

9. A soil treatment composition comprising one or more ground slags having a free lime content of greater than 18% by weight.

10. A method of drying and flocculating a soil, which comprises adding to the soil an effective amount of the soil treatment composition as claimed in claim 8 to dry and flocculate said soil.

11. The process according to claim 2, wherein the step of adding free lime is preceded by a step of chemically analyzing the slag or slags in order to determine the necessary amount of free lime to be added in order to attain or exceed the second value.

12. The process according to claim 11, wherein said selection step comprises selecting slag heats in a molten state coming from a pig iron-to-steel converter, according to a charge of lime added to said converter in order to prepare the steel.

* * * * *